Patented Feb. 12, 1935

1,991,332

UNITED STATES PATENT OFFICE

1,991,332

MANUFACTURE OF TERTIARY-ALKYL-SUBSTITUTED AROMATIC DERIVATIVES

Ralph P. Perkins, Andrew J. Dietzler, and Joseph T. Lundquist, Midland, Mich., assignors to The Dow Chemical Company, Midland, Mich., a corporation of Michigan No Drawing. Application October 29, 1931, Serial No. 571,856

8 Claims. (Cl. 260—154)

The present invention relates to improved procedure for making tertiary-alkyl-substituted aromatic compounds, such as tertiary alkyl benzenes or the corresponding alkyl-substituted phenols. The commercial process for the manufacture, for instance, of para-tertiary-butyl phenol as a specific example of the class of compounds in question consists in condensing tertiary butyl chloride with phenol in the presence of a catalyst such as anhydrous ferric chloride or aluminum chloride. The reaction commences readily upon simply bringing the components together, being accompanied by an active evolution of hydrogen chloride gas, which carries along with it vapors of the relatively volatile butyl chloride. In order to avoid loss of the latter, accordingly, it is necessary to recover the chloride from the acid gas. The treatment of the corrosive exit gases from the reaction for recovery of the valuable butyl chloride therefrom, as ordinarily carried out, however, involves troublesome manipulation and the use of special equipment made of acid-resistant material, and in the end there is more or less loss of butyl chloride as well as the necessity of disposing of the hydrogen chloride.

We have now found that the aforesaid difficulties and disadvantages may be entirely overcome or avoided in a simple and economical manner by scrubbing or otherwise contacting the exit gases with tertiary butyl alcohol. Thereby the butyl chloride vapors are condensed and dissolved and the hydrogen chloride reacts with the alcohol to form more tertiary butyl chloride which may be returned as raw material for carrying on the principal reaction. The invention, then, consists in the improved method hereinafter fully described and particularly pointed out in the claims.

Our improved method involves a cyclic mode of operation consisting of two principal steps, viz.;—

(1) In which tertiary butyl chloride and phenol are condensed, and (2) In which hydrogen chloride evolved in step (1) is absorbed in tertiary butyl alcohol to convert the latter to the corresponding chloride, the latter then being returned to step (1) as the tertiary butyl chloride therein.

The condensation reaction is carried out by mixing tertiary-butyl chloride and phenol in approximately equimolecular proportions, together with about 0.25 to 1.0 per cent of a catalyst, e. g. anhydrous $FeCl_3$ or $AlCl_3$, in a suitable reactor provided with stirring means and with pipe coils or a steam jacket for introducing heat to the charge, if necessary, to complete the reaction. Means are also provided to take off gaseous reaction products and conduct the same to another reaction chamber. Initially the reaction between the primary components may be effected at room temperature, and is allowed to proceed until precipitation of solid product commences. Moderate heating may then be resorted to for maintaining the mixture in a fluid condition until the reaction is completed, the temperature advisedly not exceeding 50° to 60° C., after which the product is worked up in known manner for separation of a purified tertiary-butyl phenol product.

During the progress of the condensation reaction hydrogen chloride is rapidly evolved and passes out through the exit passage carrying with it vapors of the butyl chloride. Commonly as much as 10 to 15 per cent of the butyl chloride present may be removed from the reactor in the exit gases. Such gases are led to a second reactor, already referred to, where they are absorbed in a body of tertiary butyl alcohol. The acid reacts directly with the alcohol at ordinary temperatures to produce the tertiary butyl chloride, while the butyl chloride vapors accompanying the acid are condensed therein. At the beginning of the absorption the temperature of the liquid may be allowed to vary between room temperature and 60°–70° C., but as conversion of alcohol to chloride approaches completion, the mixture should be cooled to a temperature materially below the boiling point of the chloride, e. g. 51° C., preferably to about 20°–30° C.

Theoretically sufficient hydrogen chloride is given off in the principal reaction to produce by reaction with the alcohol an amount of butyl chloride equal to that reacted in the first instance. In practice, however, some acid must be added from another source to make up for losses in order to complete the cycle of operations and maintain a balance between the various reacting materials. In the reaction of the acid and alcohol water is produced, which is eliminated from the system as a solution of hydrogen chloride, thus accounting for a part of the losses of the latter. The butyl chloride produced in the second stage of the cycle is separated from the aqueous layer and may then be returned to the first stage for reaction with phenol.

By operating in the cyclic manner just described we have found that the yield of tertiary-butyl phenol on the butyl alcohol employed is increased as much as 10 per cent over that previously obtainable. Furthermore, the hydrogen chloride produced in the condensation step is most economically and efficiently recovered and utilized by absorbing in butyl alcohol to produce more butyl chloride for continuing the process, thereby also avoiding necessity for separately recovering butyl chloride vapors from the acid gas. In the complete cycle the yield of tertiary-butyl phenol is 70 to 80 per cent on the tertiary butyl alcohol used, and 85 to 95 per cent on the phenol reacted.

Similar procedure may be followed in preparing homologous tertiary-alkyl-substituted phenols or aromatic hydrocarbons and derivatives thereof generally which are capable of being condensed with a tertiary alkyl halide to form the corresponding tertiary alkyl substituted aromatic compound with accompanying evolution of gaseous hydrogen halide. Such hydrogen halide, which in practice may carry with it vapors of tertiary alkyl halide, may be absorbed in the corresponding tertiary alcohol to reproduce the tertiary alkyl halide directly without necessitating the use of heat or pressure or another chemical reagent to facilitate the reaction, and the tertiary alkyl halide so formed may then be used in the condensation reaction.

For example, we have carried out the condensation of benzene and tertiary butyl chloride in the presence of anhydrous aluminum chloride as catalyst to produce tertiary butyl benzene, absorbing the exit gases, consisting of hydrogen chloride and vapors of tertiary butyl chloride, in tertiary butyl alcohol to form additional tertiary butyl chloride, and then employing such formed and recovered chloride in the primary reaction. We have likewise condensed phenol with tertiary amyl chloride under similar conditions to those hereinbefore described, to form tertiary amyl phenol, absorbing the exit gases in tertiary amyl alcohol to reproduce the chloride and then using the latter in the principal reaction. Similar results may be obtained by reacting the tertiary alkyl bromide instead of the chloride, and absorbing the hydrogen bromide evolved in the corresponding alcohol. In general, tertiary-alkyl-substituted aromatic compounds may be prepared in the manner described with the most economical recovery and reuse of gaseous products given off in the condensation reaction.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making a tertiary-alkyl-substituted aromatic hydrocarbon or derivative thereof wherein a tertiary alkyl halide is reacted with the aromatic compound, the improvement which consists in scrubbing the exit gases from the reaction with the tertiary alcohol corresponding to the alkyl halide employed.

2. In a method of making a tertiary-alkyl-substituted benzene derivative wherein a tertiary alkyl chloride is reacted with the benzene derivative, the improvement which consists in scrubbing the exit gases from the reaction with the tertiary alcohol corresponding to the alkyl chloride employed.

3. In a method of making tertiary-butyl phenol wherein tertiary butyl chloride is reacted with phenol, the improvement which consists in scrubbing the exit gases from the reaction with tertiary butyl alcohol.

4. A cyclic method of making a tertiary-alkyl-substituted aromatic compound which comprises reacting a tertiary alkyl halide with an aromatic compound to form the corresponding tertiary-alkyl-substituted aromatic derivative, passing exit gases from the reaction, including hydrogen halide liberated thereby, into the tertiary alcohol corresponding to the alkyl halide employed, whereby to produce more of such halide, and returning such alkyl halide to the first step.

5. A cyclic method of making a tertiary-alkyl-substituted benzene derivative which comprises reacting a tertiary alkyl chloride with a benzene hydrocarbon or derivative thereof to form the corresponding tertiary-alkyl-substituted benzene derivative, passing exit gases from the reaction, including hydrogen chloride liberated thereby, into the tertiary alcohol corresponding to the alkyl chloride employed, whereby to produce more of such chloride, and returning such alkyl chloride to the first step.

6. A cyclic method of making tertiary-butyl-phenol which comprises reacting tertiary butyl chloride with phenol, passing exit gases from the reaction, including hydrogen chloride liberated thereby, into tertiary butyl alcohol and returning the tertiary butyl chloride formed thereby to the first step.

7. A cyclic method of making tertiary-butyl-benzene which comprises reacting tertiary butyl chloride with benzene, passing exit gases from the reaction, including hydrogen chloride liberated thereby, into a body of tertiary butyl alcohol and returning the tertiary butyl chloride formed thereby to the first step.

8. A cyclic method of making tertiary-amyl-phenol which comprises reacting tertiary amyl chloride with phenol, passing exit gases from the reaction, including hydrogen chloride liberated thereby, into a body of tertiary amyl alcohol and returning the tertiary amyl chloride formed thereby to the first step.

RALPH P. PERKINS.
ANDREW J. DIETZLER.
JOSEPH T. LUNDQUIST.